(12) United States Patent
Low et al.

(10) Patent No.: US 10,275,274 B2
(45) Date of Patent: Apr. 30, 2019

(54) COMBINATIONS OF REMOVABLE WORKLOAD OPTIMIZED MODULES FOR IMPLEMENTING DIFFERENT APPLICATION WORKLOADS

(71) Applicant: Trend Micro Incorporated, Tokyo (JP)

(72) Inventors: Stephen G. Low, Austin, TX (US);
James Rolette, Austin, TX (US);
Edward A. Wartha, Austin, TX (US);
Matthew Laswell, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 260 days.

(21) Appl. No.: 15/196,611

(22) Filed: Jun. 29, 2016

(65) Prior Publication Data

US 2016/0306653 A1 Oct. 20, 2016

Related U.S. Application Data

(63) Continuation of application No. PCT/US2014/011911, filed on Jan. 16, 2014.

(51) Int. Cl.
*G06F 9/46* (2006.01)
*G06F 15/78* (2006.01)
*G06F 21/55* (2013.01)
*G06F 9/50* (2006.01)

(52) U.S. Cl.
CPC .............. *G06F 9/46* (2013.01); *G06F 9/5044* (2013.01); *G06F 15/7803* (2013.01); *G06F 21/55* (2013.01); *G06F 2221/034* (2013.01)

(58) Field of Classification Search
None
See application file for complete search history.

(56) References Cited

U.S. PATENT DOCUMENTS 7,953,912 B2 * 5/2011 Krishnamurthy ..... G06F 9/5061
345/502
8,229,918 B2 7/2012 Branscome et al.
8,244,718 B2 8/2012 Chamdani et al.
(Continued)

*Primary Examiner* — Eric C Wai
(74) *Attorney, Agent, or Firm* — Okamoto & Benedicto LLP

(57) ABSTRACT

According to an example, configurable workload optimization may include selecting a performance optimized application workload from available performance optimized application workloads. A predetermined combination of removable workload optimized modules may be selected to implement the selected performance optimized application workload. Different combinations of the removable workload optimized modules may be usable to implement different ones of the available performance optimized application workloads. The predetermined combination of the removable workload optimized modules may be managed to implement the selected performance optimized application workload. Data flows directed to the predetermined combination of the removable workload optimized modules may be received. The data flows may be analyzed based on attributes of the data flows, and redirected for processing by one of the removable workload optimized modules of the predetermined combination of the removable workload optimized modules based on the analysis.

14 Claims, 14 Drawing Sheets

(56) References Cited

U.S. PATENT DOCUMENTS

| | | | |
|---|---|---|---|
| 8,468,151 B2 | 6/2013 | Branscome et al. | |
| 2007/0256076 A1* | 11/2007 | Thompson | G06F 9/5066 718/102 |
| 2012/0047126 A1 | 2/2012 | Branscome et al. | |
| 2013/0007257 A1* | 1/2013 | Ramaraj | H04L 63/0263 709/224 |

* cited by examiner

COMBINATIONS OF REMOVABLE WORKLOAD OPTIMIZED MODULES FOR IMPLEMENTING DIFFERENT APPLICATION WORKLOADS

CROSS-REFERENCE TO RELATED APPLICATION

This application is a continuation of International Application No. PCT/US2014/011911, with an International Filing Date of Jan. 16, 2014, which is incorporated herein by reference in its entirety.

BACKGROUND

Typically, a dedicated hardware appliance implements specific workload processors on a fixed configuration printed wiring assembly. For example, a dedicated gaming system implements specific workload processors on a fixed configuration printed wiring assembly. This purpose-built approach to dedicated hardware appliances provides reduction in the costs associated with such hardware appliances. This purpose built approach to dedicated hardware appliances also provides performance improvements compared to general purpose computers that a user may attempt to use for such specialized workloads.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
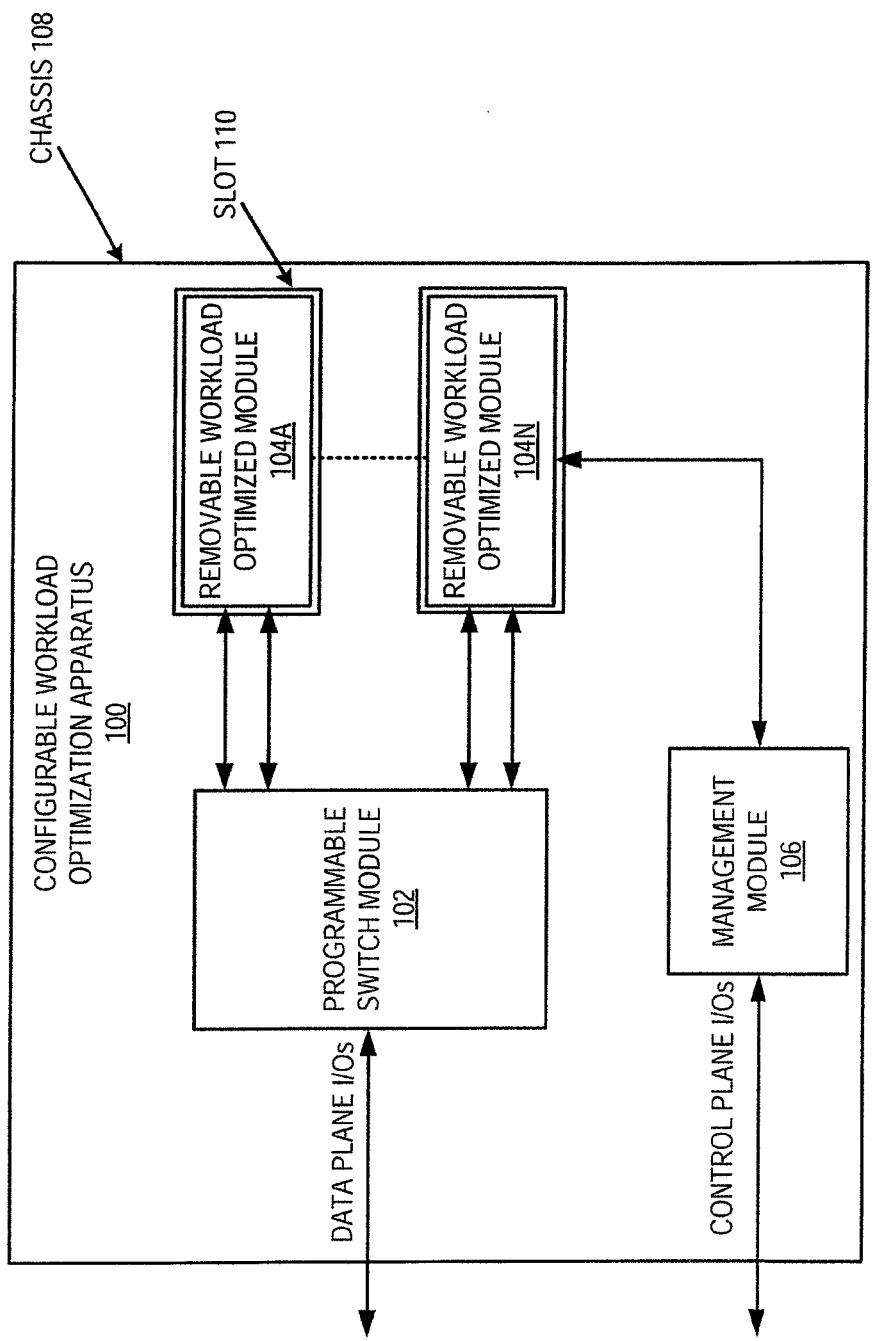
FIG. 1 illustrates an architecture of a configurable workload optimization apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples, a configurable workload optimization apparatus and a method for configurable workload optimization are disclosed herein. The apparatus and method disclosed herein may implement a plurality of workload optimized processors in removable workload optimized modules to implement performance optimized application workloads. For example, the workload optimized modules of the apparatus disclosed herein may include central processing unit (CPU) modules, graphics processing unit (GPU) modules, network processing unit (NPU) modules, digital signal processing (DSP) modules, and field-programmable gate array (FPGA) modules. For an example of an IPS disclosed herein, the apparatus and method disclosed herein may use FPGA and NPU modules for a data plane, a CPU module for a control plane. For the IPS example disclosed herein, the data plane may generally constitute the area of the apparatus where security is being applied to the traffic that is flowing through the apparatus. The control plane may provide, for example, monitoring of the apparatus, application of rules to the data plane traffic, responding to user requests, etc. Generally, the data plane may provide for processing of packets and the control plane may provide management related to the processing. The control plane may also provide for management of a plurality of different performance optimized application workloads. The use of the FPGA and NPU modules for the data plane, and the CPU module for the control plane with the apparatus and method disclosed herein may provide a high performance, low power, and scalable, distributed IPS that has a hardware implementation using high volume, workload optimized modules.

The apparatus and method disclosed herein may include an internal fabric that may be programmed to direct workflows to the appropriate workload optimized modules. The workload optimized modules may be configured to implement a variety of performance optimized application workloads. These aspects may provide the volume economics of general purpose computers. The apparatus and method disclosed herein may provide machine readable instructions based support of different types of the workload optimized modules to allow a user to achieve the functionality of a plurality of dedicated hardware appliances.

According to an example, the configurable workload optimization apparatus may include a plurality of slots for a plurality of removable workload optimized modules for a data plane of the configurable workload optimization apparatus. The plurality of removable workload optimized modules may implement different ones of a plurality of available performance optimized application workloads based on different combinations of the plurality of removable workload optimized modules. The configurable workload optimization apparatus may further include a management module for a control plane of the configurable workload optimization apparatus. The management module may manage a predetermined combination of the plurality of removable workload optimized modules to implement a selected performance optimized application workload of the plurality of available performance optimized application workloads. The configurable workload optimization apparatus may further include a programmable switch module to receive data flows directed to the predetermined combination of the plurality of removable workload optimized modules, analyze the data flows based on attributes of the data flows, and redirect the data flows for processing by one of the plurality of removable workload optimized modules of the predetermined combination of the plurality of removable workload optimized modules based on the analysis. The configurable workload optimization apparatus may further include a chassis including the plurality of slots, where each slot of the plurality of slots may correspond to each of the plurality of removable workload optimized modules. A cluster fabric may communicatively interconnect the plurality of slots to provide selectable configuration of the configurable workload optimization apparatus as a single embedded IPS subsystem, as a plurality of IPS appliances, and as a single IPS appliance. According to an example, each of the plurality of removable workload optimized modules may be formed as a cartridge for removable insertion into one of the plurality of slots.

FIG. 1 illustrates an architecture of a configurable workload optimization apparatus (hereinafter also referred to as "apparatus 100"), according to an example of the present disclosure. Referring to FIG. 1, the apparatus 100 is depicted as including a programmable switch module 102 to select a predetermined combination of removable workload optimized modules 104A-104N to implement a selected performance optimized application workload from available performance optimized application workloads. Different combinations of the removable workload optimized modules 104A-104N may be usable to implement different ones of the available performance optimized application workloads.

The programmable switch module 102 may receive data flows directed to the predetermined combination of the removable workload optimized modules 104A-104N, analyze the data flows based on attributes of the data flows, and redirect the data flows for processing by one of the removable workload optimized modules 104A-104N of the predetermined combination of the removable workload optimized modules 104A-104N based on the analysis. The attributes may include, for example, source, destination, virtual local area network (VLAN), and/or other qualifiers.

The programmable switch module 102 may redirect a subset of the data flows based on the analysis for processing by the predetermined combination of the removable workload optimized modules 104A-104N. Further, the programmable switch module 102 may prevent a remaining subset of the data flows from being directed to the predetermined combination of the removable workload optimized modules 104A-104N.

The programmable switch module 102 may provide support for customer input/output, aggregation, and multiplexing related to the removable workload optimized modules 104A-104N. The programmable switch module 102 may provide VLAN translation. The programmable switch module 102 may provide hitless reboot and upgrade capabilities. The programmable switch module 102 may generates flow records, and forward the records to a management module 106 as described herein.

The removable workload optimized modules 104A-104N may include central processing unit (CPU) modules, graphics processing unit (GPU) modules, network processing unit (NPU) modules, digital signal processing (DSP) modules, and field-programmable gate array (FPGA) modules. The CPU module may perform the instructions of a computer program for implementing the available performance optimized application workloads by performing general arithmetic, logical, and input/output operations. The GPU module may manipulate and alter memory to accelerate the manipulation of video data. The NPU module may function, for example, as a packet processor to perform pattern matching, key lookup, computation, data bitfield manipulation, queue management, control processing, and quick allocation and re-circulation of packet buffers. The DSP module may perform the mathematical manipulation of information signals to modify and/or improve the signals as needed. The FPGA module may be configured by a user, for example, by manipulating the programmable logic components of the FPGA as needed.

The workload optimized modules 104A-104N may be interconnected by a switched fabric in a general purpose chassis 108. The workload optimized modules 104A-104N may be provided in a cartridge configuration for insertion in slots 110 provided in the chassis 108 for each workload optimized module.

The apparatus 100 may use the management module 106 (e.g., a CPU) for a control plane, and the workload optimized modules 104A-104N for a data plane. The management module 106 may provide dedicated management of the predetermined combination of the removable workload optimized modules 104A-104N to implement the selected performance optimized application workload.

The modules and other elements of the apparatus 100 may be machine readable instructions stored on a non-transitory computer readable medium. In addition, or alternatively, the modules and other elements of the apparatus 100 may be hardware or a combination of machine readable instructions and hardware.

The data plane bandwidth may be scaled using the programmable switch module 102 switch as a load balancer to distribute packet flows to the workload optimized modules 104A-104N. The number of the data plane workload optimized modules 104A-104N may be scaled from a single pair to effectively filling all available slots 110 in the chassis 108.

Figure 2:
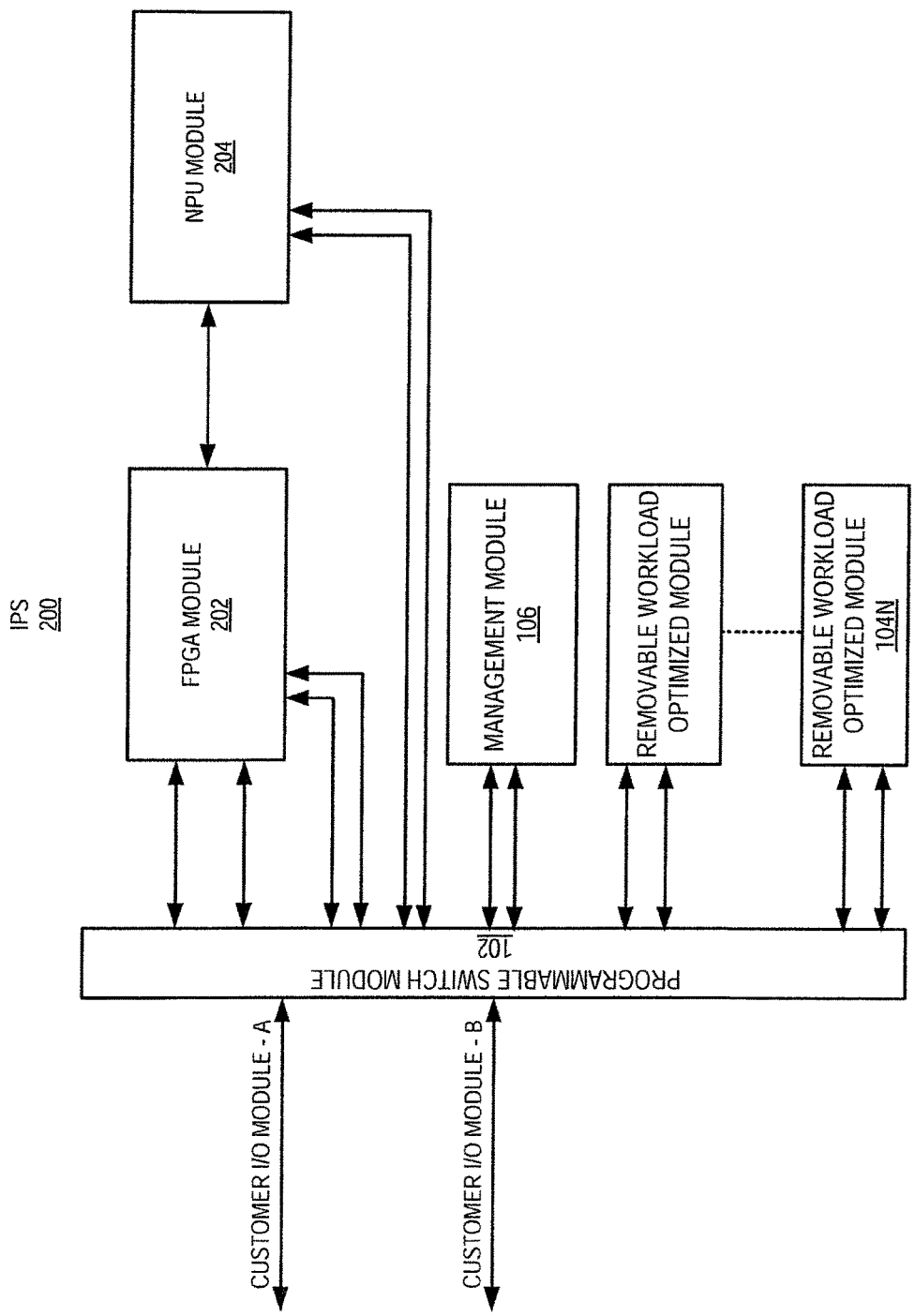
FIG. 2 illustrates a specific application of the configurable workload optimization apparatus for an intrusion prevention system (IPS), and a plurality of additional removable workload optimized modules for additional applications, according to an example of the present disclosure.

FIG. 2 illustrates a specific application of the configurable workload optimization apparatus 100 for an IPS 200, according to an example of the present disclosure. The IPS 200 may use the management module 106 for a control plane. Further, the IPS 200 may use FPGA and NPU modules 202, 204, respectively, for the data plane. For the example of FIG. 2 and generally, the FPGA module 202 may provide for hardware offload and acceleration. For example, the FPGA module 202 may loop back traffic in case of failure of the management module 106. The FPGA module 202 may provide load balancing of data flows to a plurality of the NPU modules 204, and related multiplexing. The FPGA module 202 may also provide for inspection bypass of traffic. For the example of the IPS 200, the programmable switch module 102 may receive and/or intercept particular data flows based on attributes such as source, destination, VLAN, and/or other qualifiers, and redirect the data flows for inspection by the IPS data plane modules (e.g., both the FPGA and NPU modules 202, 204, respectively), to the control plane management module 106, and to any additional removable workload optimized modules.

For the example of FIG. 2, the NPU module 204 may include a plurality of NPU modules. The NPU module 204 may operate as the IPS engine that executes any machine readable instructions for the IPS functionality. The data plane bandwidth may be scaled using the programmable switch module 102 that functions as a switch based load balancer, for example, by using a hash based mechanism, to distribute packet flows to the FPGA and NPU modules 202, 204, respectively. The number of data plane modules (e.g., both the FPGA and NPU modules 202, 204, respectively) may be scaled from a single pair to effectively filling all available slots 110 in the chassis 108.

For the implementation of the apparatus 100 as the IPS 200, the programmable switch module 102 may separate incoming packets of the data flows, for example, into three categories. For example, the programmable switch module 102 may separate incoming packets of the data flows into a known approved category that includes packets that show no signs of containing attacks, and forward the approved category packets to their intended destinations. The programmable switch module 102 may separate incoming packets of the data flows into a known disapproved category that includes packets that are to be dropped, and drop the disapproved category packets. The programmable switch module 102 may separate incoming packets of the data flows into a suspicious category that includes packets that need further inspection, and forward the suspicious category packets for further analysis.

According to an example, the data flows received and/or intercepted and redirected by the programmable switch module 102 may also be managed by software-defined networking (SDN) networks. Data flows that pass the inspection by the programmable switch module 102 may be passed transparently to their original destination. For example, data flows that pass the inspection may be passed transparently to the appropriate workload optimized modules 104A-104N. Data Flows that do not pass the inspection may be blocked. Alternatively, data flows that do not pass the inspection may be passed to the control plane management module 106 for other specified actions. In this manner, the configurable workload optimization apparatus 100 may operate as a resource that may be used as needed for implementing a specific performance optimized application workload (e.g., intrusion prevention).

Figure 3:
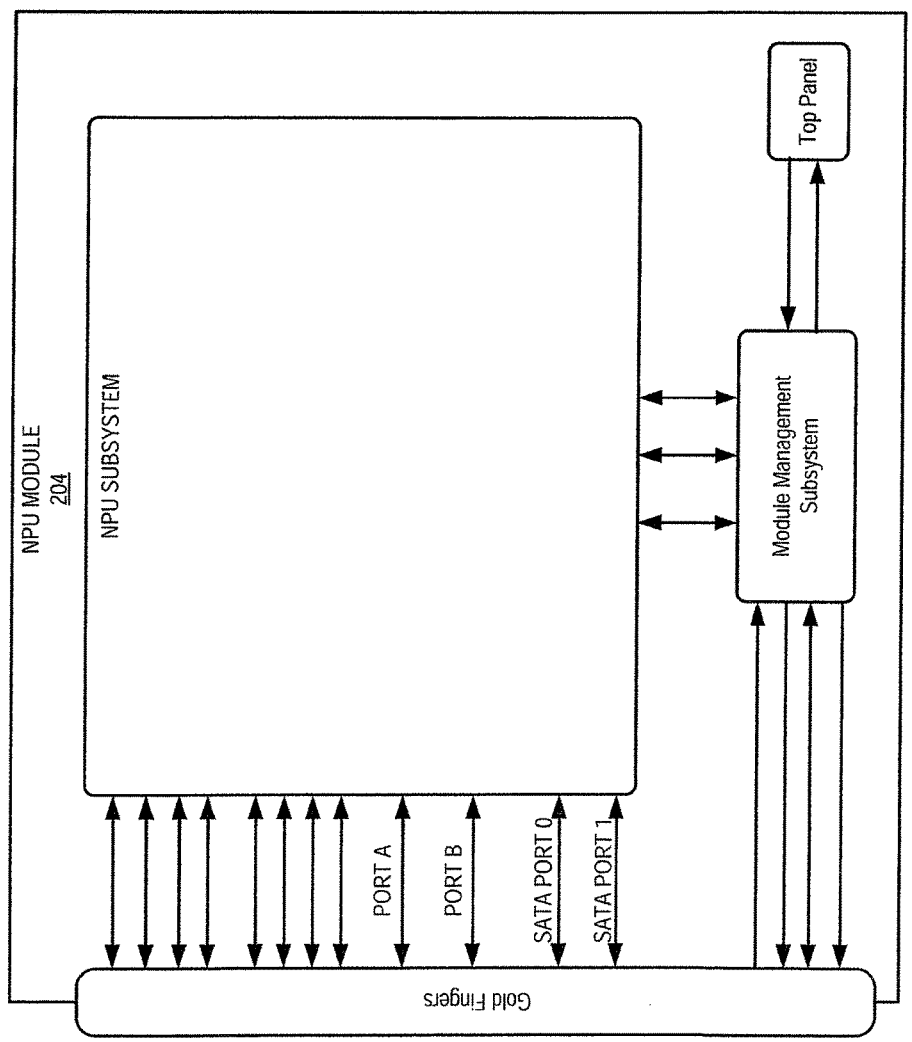
FIG. 3 illustrates an example of a network processing unit (NPU) module for the configurable workload optimization apparatus, according to an example of the present disclosure.
Figure 4:
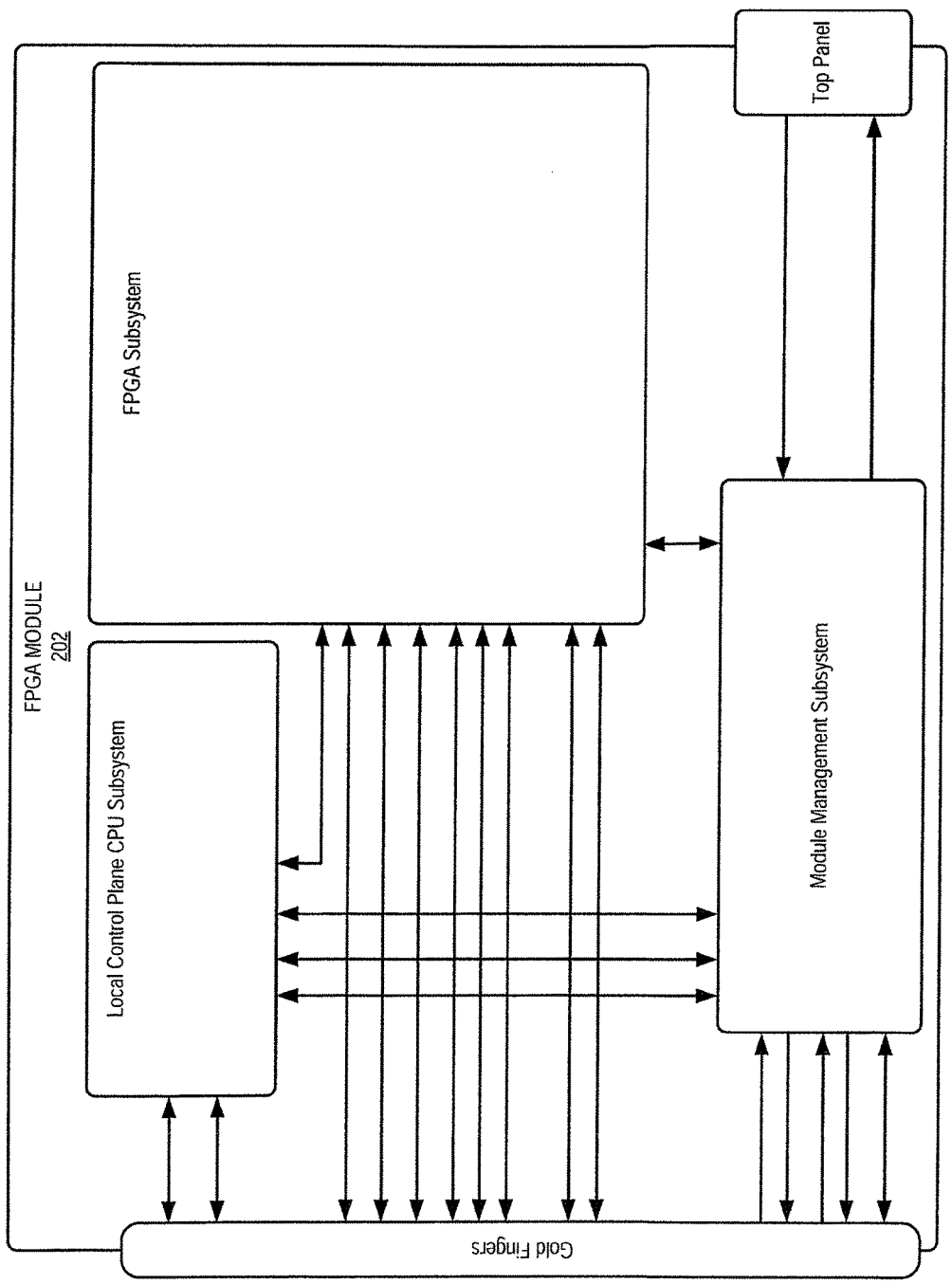
FIG. 4 illustrates an example of a field-programmable gate array (FPGA) module for the configurable workload optimization apparatus, according to an example of the present disclosure.

FIG. 3 illustrates an example of a NPU module (e.g., the NPU module 204) for the configurable workload optimization apparatus 100, according to an example of the present disclosure. As described herein, the NPU module may function, for example, as a packet processor to perform pattern matching, key lookup, computation, data bitfield manipulation, queue management, control processing, and quick allocation and re-circulation of packet buffers. Compared to general purpose processors, the foregoing functions may be optimized for the NPU module. For example, with respect to pattern matching, the NPU module may be optimized to locate specific patterns of bits or bytes within packets in a packet stream. With respect to key lookup, the NPU module may be optimized to undertake a database lookup using a key to find a result, such as, for example, routing information. With respect to computation, the NPU module may be optimized to perform computations related to the various functions described herein for the NPU module. With respect to data bitfield manipulation, the NPU module may be optimized to change certain data fields contained in a packet as the packet is being processed. With respect to queue management, the NPU module may be optimized to store in queues packets that are received, processed and scheduled to be sent onwards. With respect to control processing, the NPU module may be optimized to control the operations related to processing of a packet. Lastly, the NPU module may also be optimized to perform quick allocation and re-circulation of packet buffers. FIG. 4 illustrates an example of a FPGA module (e.g., the FPGA module 202) for the configurable workload optimization apparatus 100, according to an example of the present disclosure. As described herein, the FPGA module may be configured by a user, for example, by manipulating the programmable logic components of the FPGA as needed.

Figure 5:
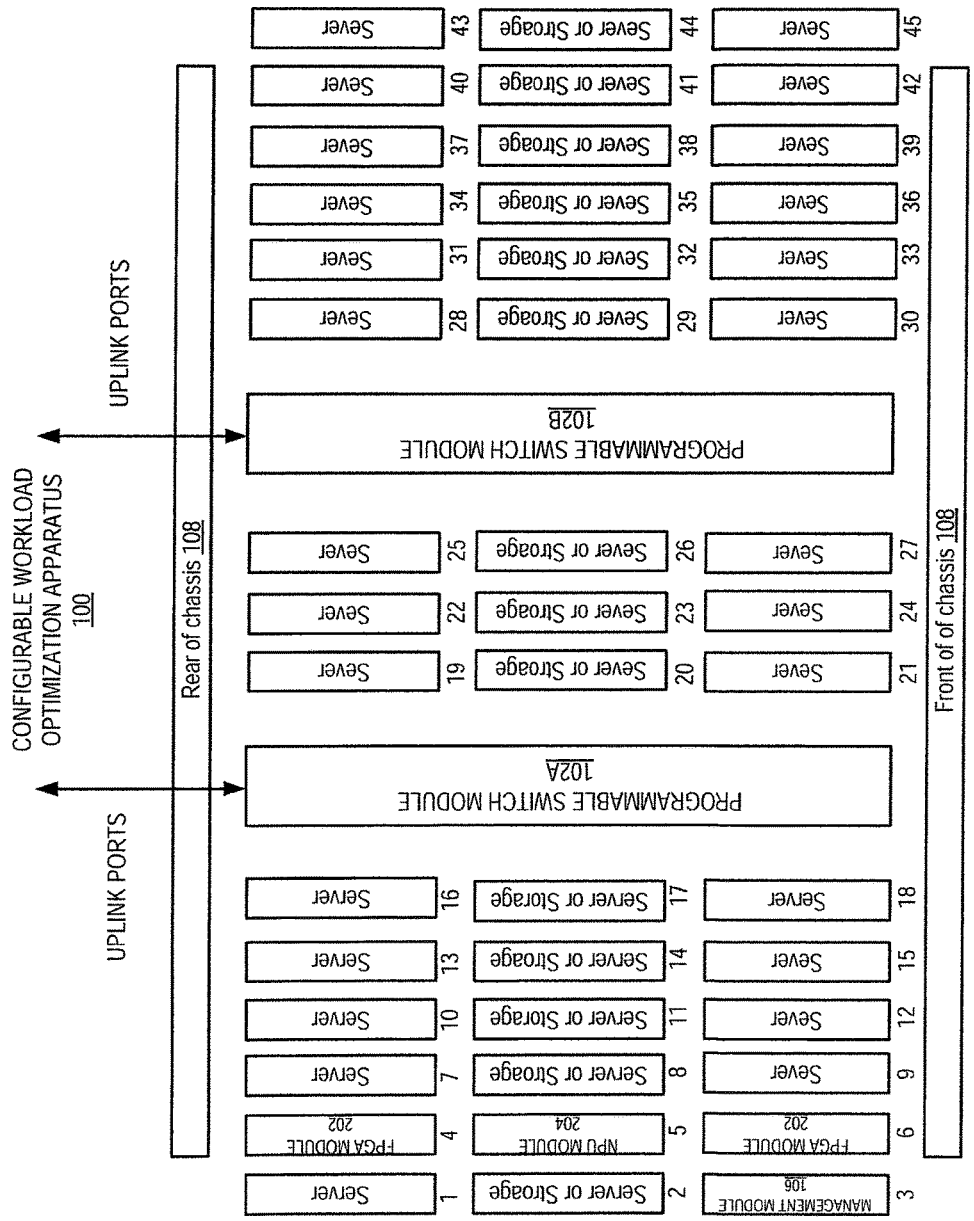
FIG. 5 illustrates an example of a single embedded IPS subsystem for the configurable workload optimization apparatus, according to an example of the present disclosure.

FIG. 5 illustrates an example of a single embedded IPS subsystem for the configurable workload optimization apparatus 100, according to an example of the present disclosure. As shown in FIG. 5, the single embedded IPS subsystem may include a management module 106 in slot 3 of the chassis 108, FPGA modules 202 in slots 4 and 6 of the chassis 108, and a NPU module 204 in slot 5 of the chassis 108. The management module 106 may manage the FPGA modules 202 and the NPU module 204. The example of the configuration of FIG. 5 may provide use of a subset of the chassis slots for IPS data plane (e.g., the FPGA modules 202, and the NPU module 204) and control plane (e.g., management module 106) modules. The remaining slots may be used for other removable workload optimized modules for targeted performance optimized application workloads. In the example of FIG. 5, of the programmable switch modules 102A and 102B, the programmable switch module 102A may provide IPS inspection for traffic to or from the uplinks to the management module 106, the FPGA modules 202, and the NPU module 204, and to any other removable workload optimized modules for targeted performance optimized application workloads. Based on the routing by the programmable switch modules 102A and 102B, the single embedded IPS subsystem may provide for uplink to server node IPS protection, and server node to server node IPS protection.

Figure 6:
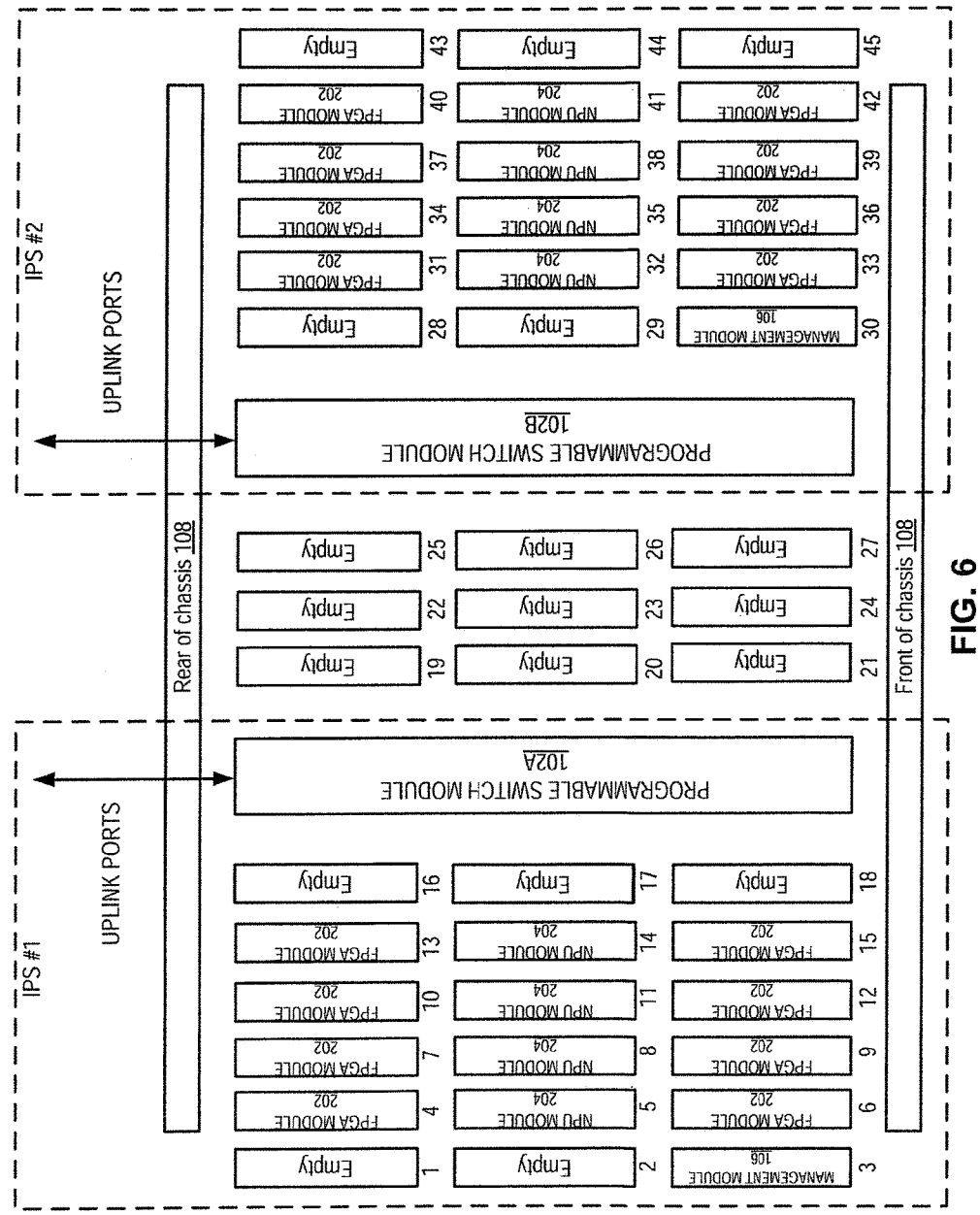
FIG. 6 illustrates an example of separate IPS appliances on a chassis for the configurable workload optimization apparatus, according to an example of the present disclosure.

FIG. 6 illustrates an example of separate IPS appliances on the chassis 108 of the configurable workload optimization apparatus 100, according to an example of the present disclosure. As shown in FIG. 6, the first separate IPS appliance (i.e., IPS #1) may include a management module 106 in slot 3 of the chassis 108, FPGA modules 202 in slots 4, 6, 7, 9, 10, 12, 13, and 15 of the chassis 108, and NPU modules 204 in slots 5, 8, 11, and 14 of the chassis 108. The second separate IPS appliance (i.e., IPS #2) may include a management module 106 in slot 30 of the chassis 108, FPGA modules 202 in slots 31, 33, 34, 36, 37, 39, 40, and 42 of the chassis 108, and NPU modules 204 in slots 32, 35, 38, and 41 of the chassis 108. In this manner, a set of n IPS appliances may be created where each appliance may include dedicated data plane and control plane removable workload optimized modules effectively providing n isolated IPSs for use by multiple users. Each IPS appliance may be managed by its own management module 106.

Figure 7:
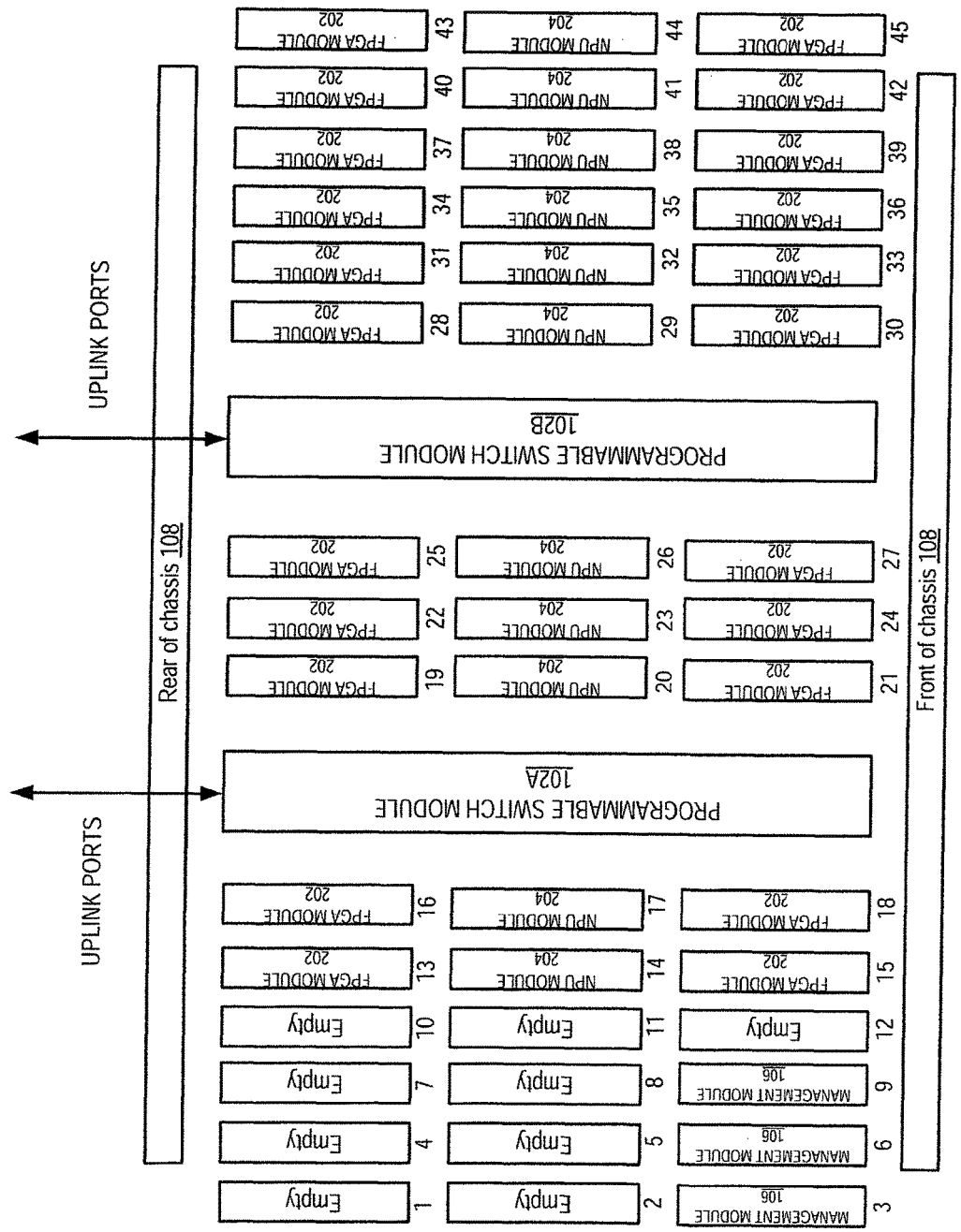
FIG. 7 illustrates an example of a single IPS appliance for the configurable workload optimization apparatus, according to an example of the present disclosure.

FIG. 7 illustrates an example of a single IPS appliance for the configurable workload optimization apparatus 100, according to an example of the present disclosure. As shown in FIG. 7, a large IPS appliance may be created by populating of the slots 110 with IPS control plane and data plane removable workload optimized modules (i.e., the management modules 106, the FPGA modules 202, and the NPU modules 204). Traffic into the programmable switch modules 102A and 102B via the uplinks may be received and/or inspected and returned via the uplinks out of the chassis 108. For example, traffic for a website may be inspected by the configurable workload optimization apparatus 100, and if authorized, the authorized traffic may be forwarded to the website. Each IPS appliance may be managed by its own management module 106 shown in slots 3, 6, and 9 of the chassis 108.

Figure 8:
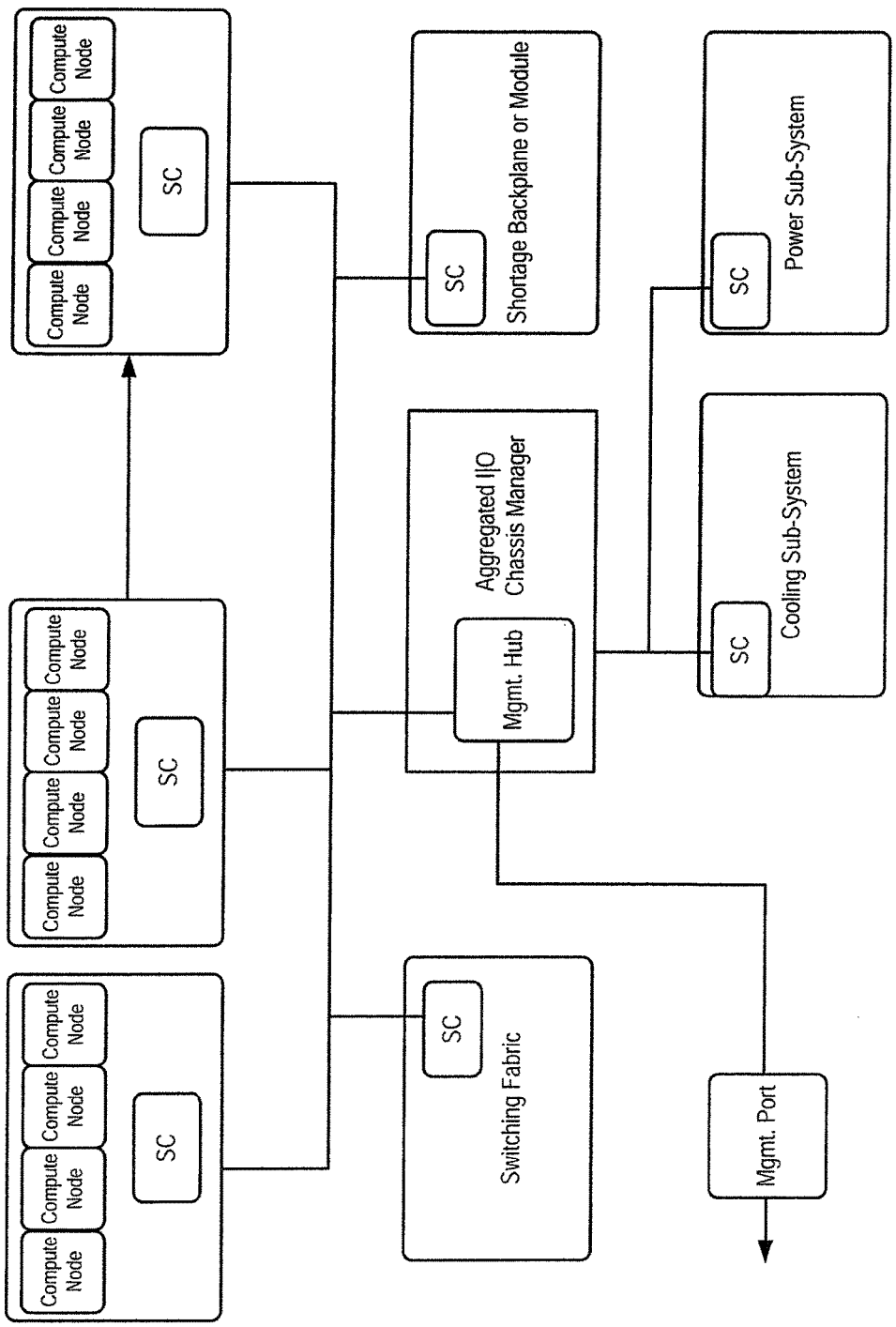
FIG. 8 illustrates a management fabric for the configurable workload optimization apparatus, according to an example of the present disclosure.

FIG. 8 illustrates a management fabric for the configurable workload optimization apparatus 100, according to an example of the present disclosure. The management fabric of FIG. 8 may provide management for the apparatus 100, and include power management, bios, flash updates, and module presence/type detection for the workload optimized modules 104A-104N. The satellite controllers (SCs) may provide low level manageability interface and control.

Figure 9:
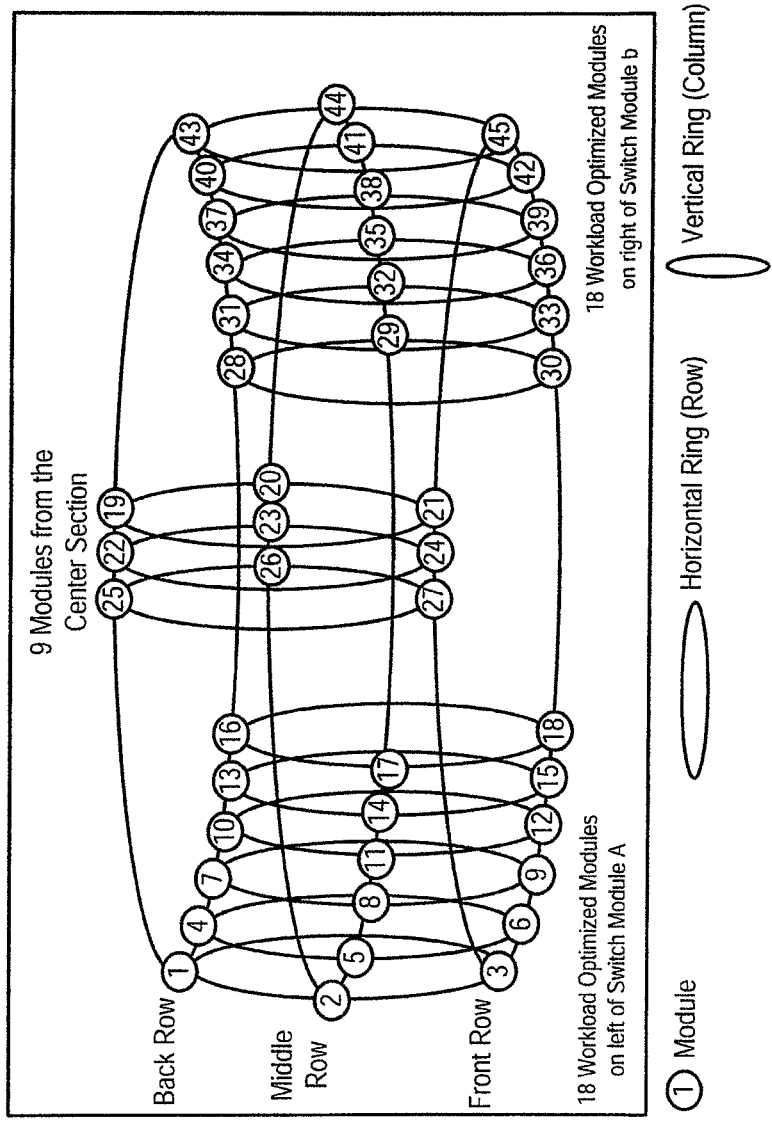
FIG. 9 illustrates a cluster fabric for the configurable workload optimization apparatus, according to an example of the present disclosure.

FIG. 9 illustrates a cluster fabric for the configurable workload optimization apparatus 100, according to an example of the present disclosure. The cluster fabric of FIG. 9 is a 2-dimensional torus that may be used to provide a cluster interconnect for the various slots 110 for the chassis 108 for the workload optimized modules 104A-104N. For example, for the 45 slot configuration of the configurable workload optimization apparatus 100, there are three rings each with 15 modules in one dimension and 15 rings each with 3 modules in another dimension. For example, the cluster interconnect may be used to provide the connection between the FPGA module 202 and the NPU module 204 in FIG. 2.

Figure 10:
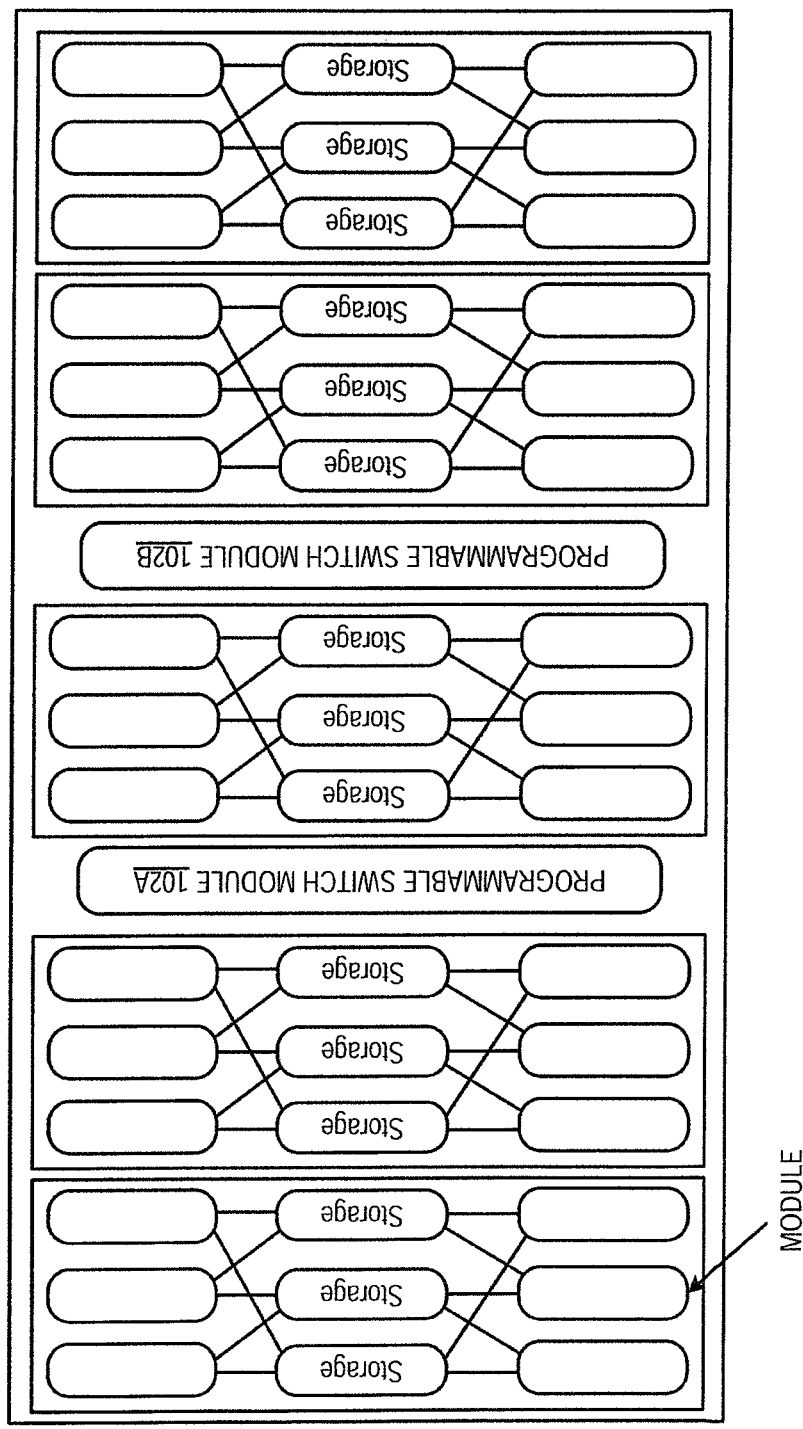
FIG. 10 illustrates a storage fabric for the configurable workload optimization apparatus, according to an example of the present disclosure.

FIG. 10 illustrates a storage fabric for the configurable workload optimization apparatus 100, according to an example of the present disclosure. As shown in FIG. 10, the various modules of the apparatus 100 may be interconnected in a bus configuration. The interconnections may be implemented as serial ATA (SATA) connections between the first row of modules (e.g., the removable workload optimized modules 104A-104N) and the second row that contains storage modules (e.g., cartridges), and also the second row and the third row. Each module may also access the storage module in the neighboring column modulo 3 so that fault tolerant storage may be provided.

Figure 11:
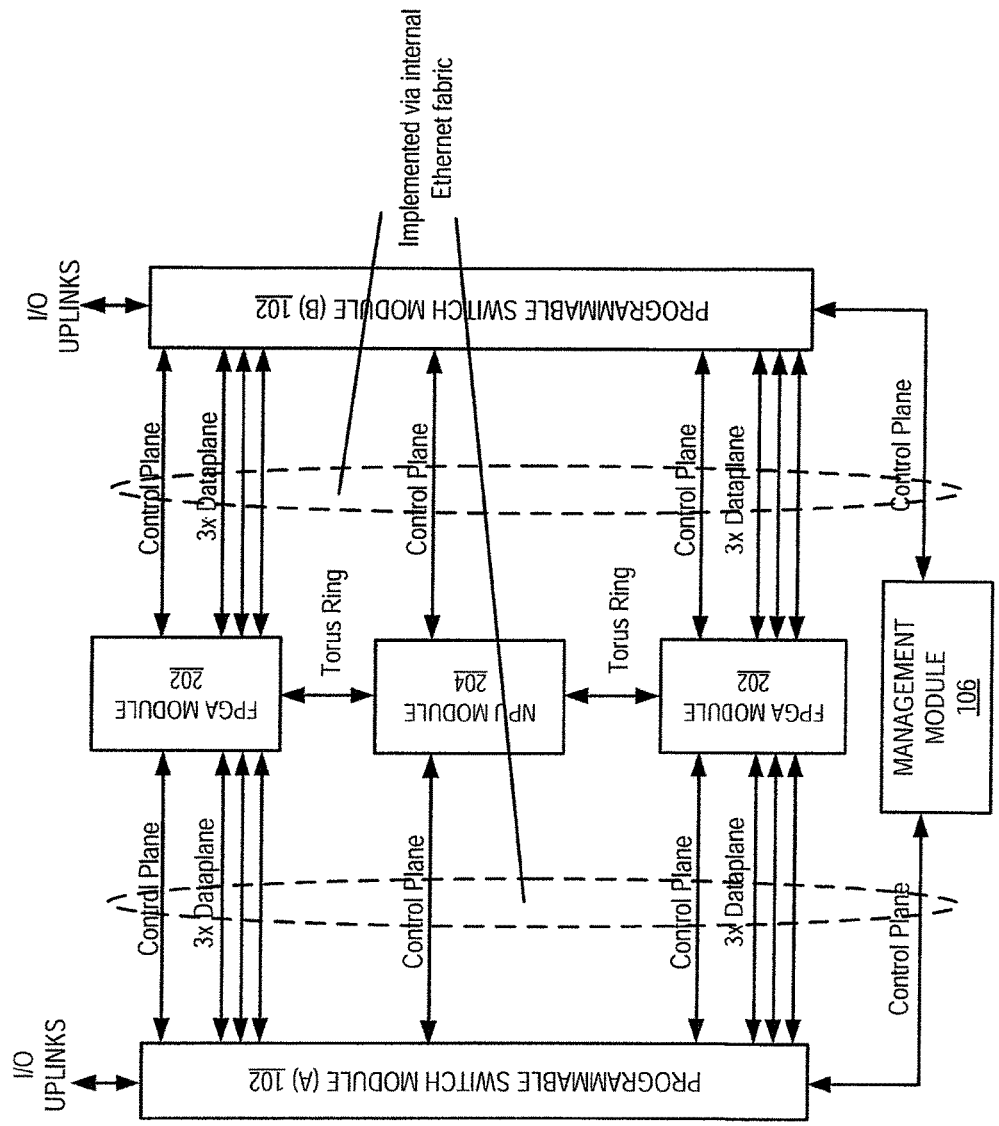
FIG. 11 illustrates interconnection of different removable workload optimized modules for the configurable workload optimization apparatus, according to an example of the present disclosure.

FIG. 11 illustrates interconnection of different removable workload optimized modules for the configurable workload optimization apparatus 100, according to an example of the present disclosure. As shown in FIG. 11, the FPGA and NPU modules 202, 204 may be interconnected via a torus ring. Further, the connection of the programmable switch modules 102 and the FPGA modules 202 may be implemented via an internal Ethernet fabric.

The IPS 200 may use processes that have been developed in the context of a fixed function appliance and ported to the process defined hardware implementation for the configurable workload optimization apparatus 100. For example, the IPS 200 may use processes that have been developed in the context of a fixed function appliance and ported to implement the workload optimized modules 104A-104N. Similarly, for the configurable workload optimization apparatus 100 generally, the processes that have been developed in the context of a fixed function appliance may be ported to implement the workload optimized modules 104A-104N.

Figure 12:
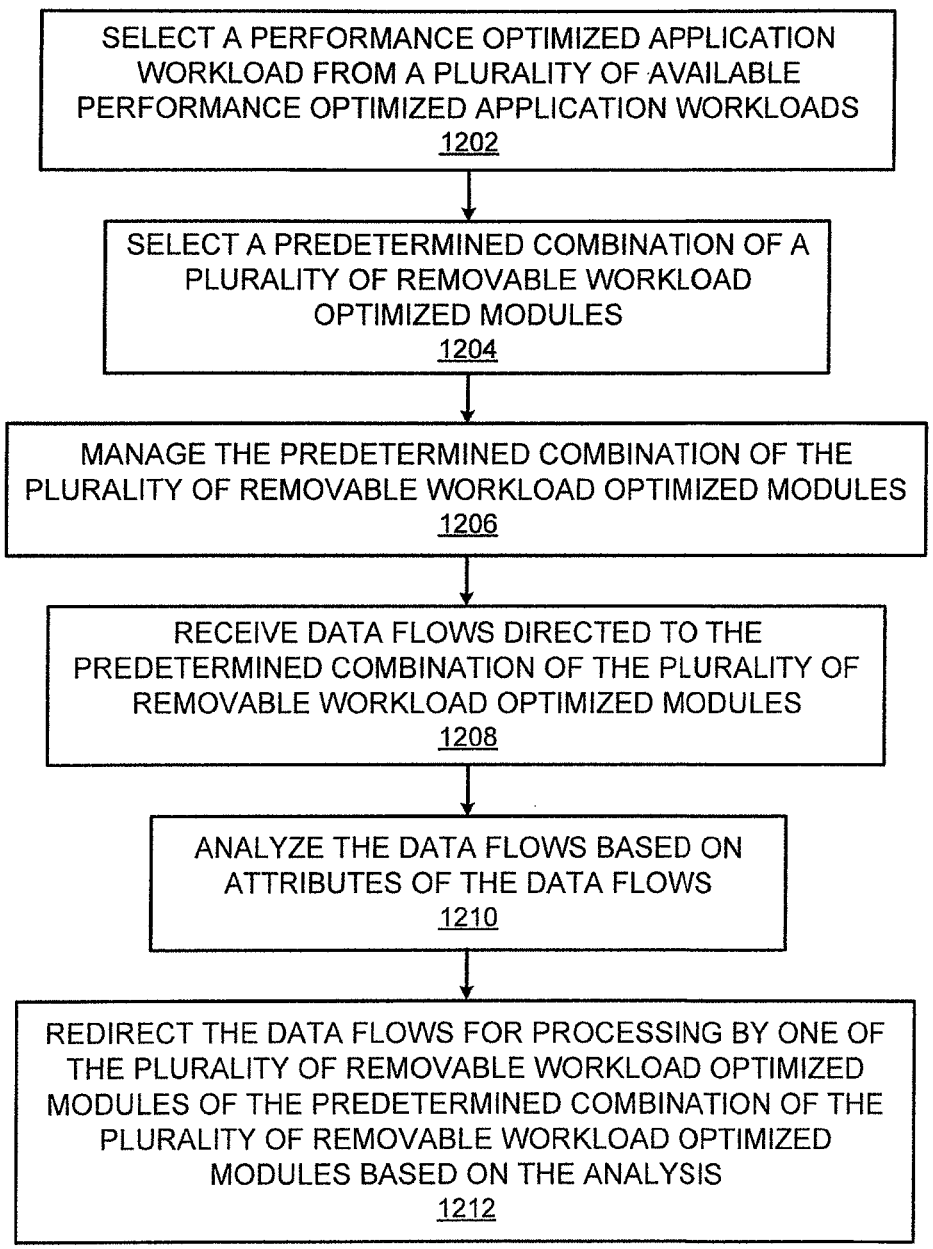
FIG. 12 illustrates a method for configurable workload optimization, according to an example of the present disclosure.
Figure 13:
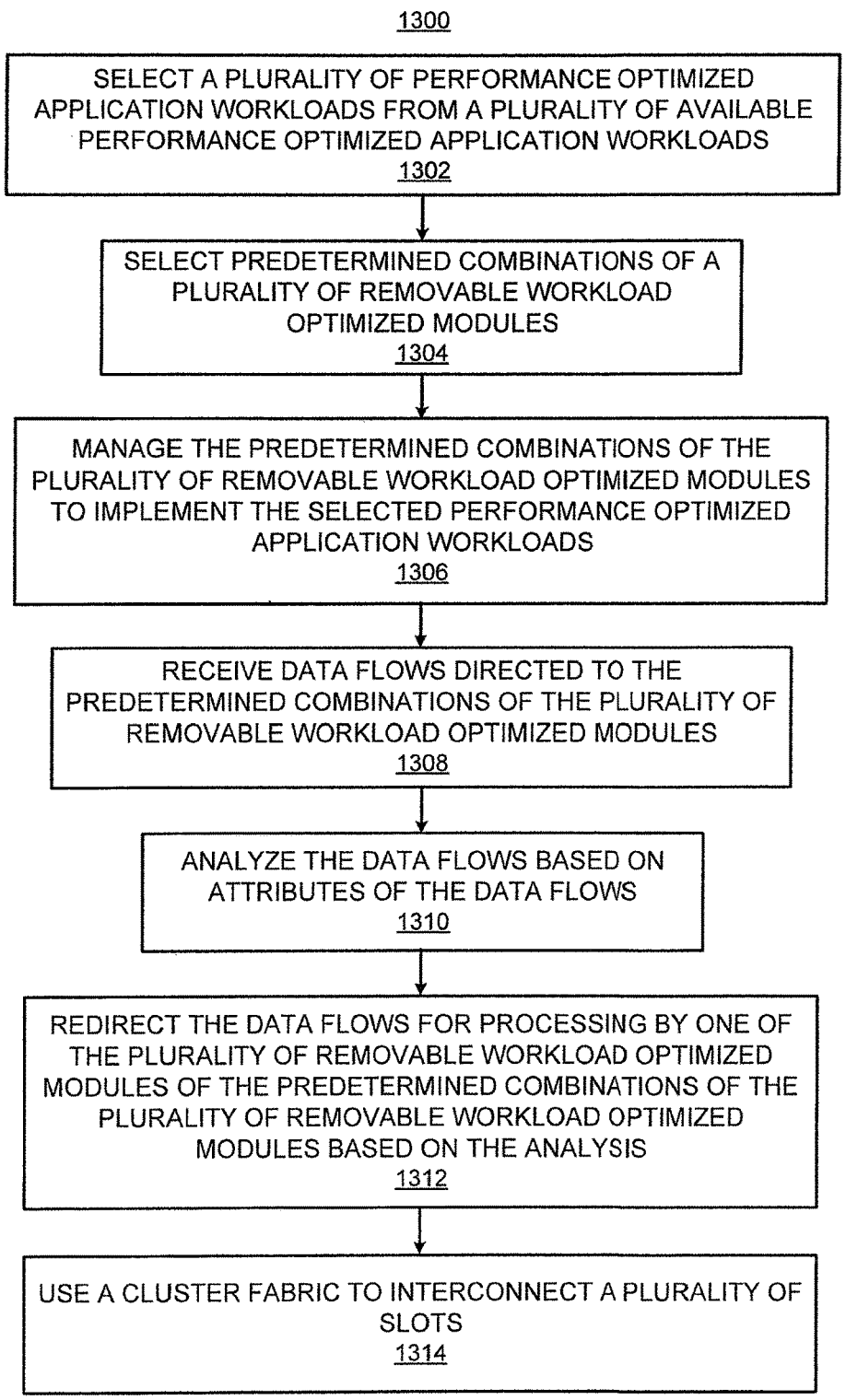
FIG. 13 illustrates further details of the method for configurable workload optimization, according to an example of the present disclosure.

FIGS. 12 and 13 respectively illustrate flowcharts of methods 1200 and 1300 for configurable workload optimization, corresponding to the example of the configurable workload optimization apparatus 100 whose construction is described in detail above. The methods 1200 and 1300 may be implemented on the configurable workload optimization apparatus 100 with reference to FIGS. 1-11 by way of example and not limitation. The methods 1200 and 1300 may be practiced in other apparatus.

Referring to FIG. 12, for the method 1200, at block 1202, the method may include selecting a performance optimized application workload from a plurality of available performance optimized application workloads. For example, referring to FIG. 1, the programmable switch module 102 may select a performance optimized application workload from a plurality of available performance optimized application workloads.

At block 1204, the method may include selecting a predetermined combination of a plurality of removable workload optimized modules 104A-104N to implement the selected performance optimized application workload. Different combinations of the plurality of removable workload optimized modules 104A-104N may be usable to implement different ones of the plurality of available performance optimized application workloads. According to an example, the plurality of removable workload optimized modules 104A-104N may include a GPU module, a NPU module, a DSP module, and a FPGA module. According to an example, the selected performance optimized application workload may include intrusion prevention, and the predetermined combination of the plurality of removable workload optimized modules 104A-104N may include a NPU module, and a FPGA module to implement intrusion prevention functionality. According to an example, the selected performance optimized application workload may include video transcoding, and the predetermined combination of the plurality of removable workload optimized modules 104A-104N may include a GPU module to implement video transcoding functionality. According to an example, the selected performance optimized application workload may include voice transcoding, and the predetermined combination of the plurality of removable workload optimized modules 104A-104N may include a DSP module to implement voice transcoding functionality.

At block 1206, the method may include managing the predetermined combination of the plurality of removable workload optimized modules 104A-104N to implement the selected performance optimized application workload. For example, referring to FIG. 1, the management module 106 may manage the predetermined combination of the plurality of removable workload optimized modules 104A-104N to implement the selected performance optimized application workload.

At block 1208, the method may include receiving data flows directed to the predetermined combination of the plurality of removable workload optimized modules 104A-104N. For example, referring to FIG. 1, the programmable switch module 102 may receive data flows directed to the predetermined combination of the plurality of removable workload optimized modules 104A-104N.

At block 1210, the method may include analyzing the data flows based on attributes of the data flows. For example, referring to FIG. 1, the programmable switch module 102 may analyze the data flows based on attributes of the data flows.

At block 1212, the method may include redirecting the data flows for processing by one of the plurality of removable workload optimized modules 104A-104N of the predetermined combination of the plurality of removable workload optimized modules 104A-104N based on the analysis. For example, referring to FIG. 1, the programmable switch module 102 may redirect the data flows for processing by one of the plurality of removable workload optimized modules 104A-104N of the predetermined combination of the plurality of removable workload optimized modules 104A-104N based on the analysis. According to an example, the method may include redirecting a subset of the data flows based on the analysis for processing by the predetermined combination of the plurality of removable workload optimized modules 104A-104N, and preventing a remaining subset of the data flows from being directed to the predetermined combination of the plurality of removable workload optimized modules 104A-104N. According to an example, the method may include separating incoming packets of the data flows into a known approved category that includes packets that show no signs of containing attacks, and forwarding the approved category packets to their intended destinations, separating incoming packets of the data flows into a known disapproved category that includes packets that are to be dropped, and dropping the disapproved category packets, and separating incoming packets of the data flows into a suspicious category that includes packets that need further inspection, and forwarding the suspicious category packets for further analysis (e.g., to the management module 106).

According to an example, the method may include using a cluster fabric to interconnect a plurality of slots 110. Each slot of the plurality of slots may correspond to each of the plurality of removable workload optimized modules 104A-104N.

Referring to FIG. 13, for the method 1300, at block 1302, the method may include selecting a plurality of performance optimized application workloads from a plurality of available performance optimized application workloads.

At block 1304, the method may include selecting predetermined combinations of a plurality of removable workload optimized modules 104A-104N to implement the selected performance optimized application workloads. Different combinations of the plurality of removable workload optimized modules 104A-104N may be usable to implement different ones of the plurality of available performance optimized application workloads. According to an example, a selected performance optimized application workload of the plurality of the selected performance optimized application workloads may include intrusion prevention, and a predetermined combination of the plurality of removable workload optimized modules 104A-104N may include a NPU module, and a FPGA module to implement intrusion prevention functionality.

At block 1306, the method may include managing the predetermined combinations of the plurality of removable workload optimized modules to implement the selected performance optimized application workloads.

At block 1308, the method may include receiving data flows directed to the predetermined combinations of the plurality of removable workload optimized modules.

At block 1310, the method may include analyzing the data flows based on attributes of the data flows.

At block 1312, the method may include redirecting the data flows for processing by one of the plurality of removable workload optimized modules 104A-104N of the predetermined combinations of the plurality of removable workload optimized modules 104A-104N based on the analysis.

At block 1314, the method may include using a cluster fabric to interconnect a plurality of slots. Each slot of the plurality of slots may correspond to each of the plurality of removable workload optimized modules 104A-104N.

Figure 14:
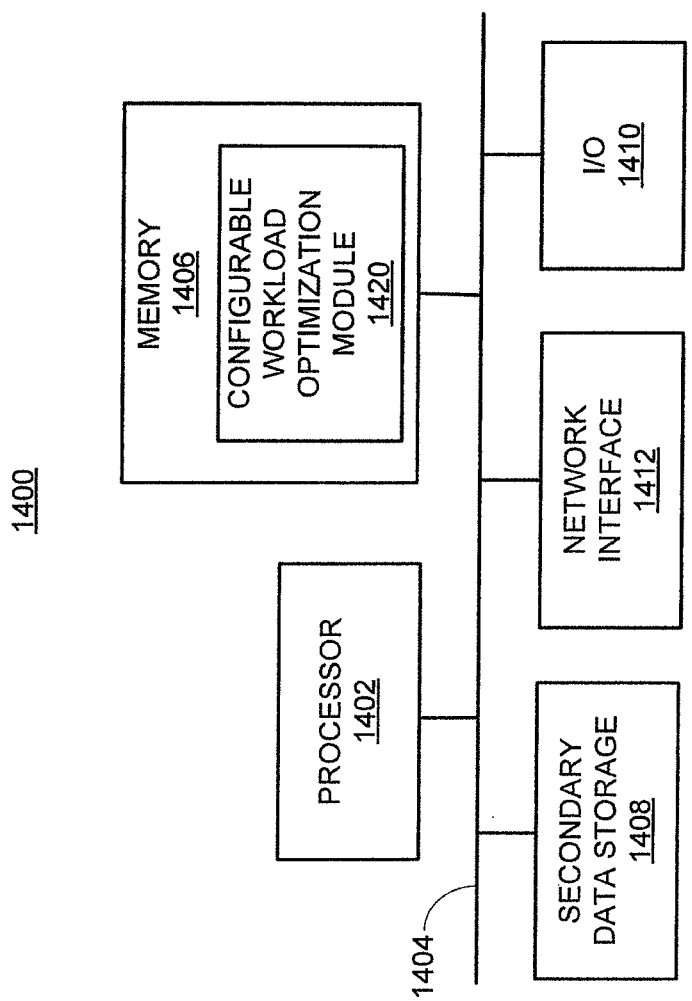
FIG. 14 illustrates a computer system, according to an example of the present disclosure.

FIG. 14 shows a computer system 1400 that may be used with the examples described herein. The computer system may represent a generic platform that includes components that may be in a server or another computer system. The computer system 1400 may be used as a platform for the apparatus 100. The computer system 1400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1400 may include a processor 1402 that may implement or execute machine readable instructions performing some or all of the methods, functions and other processes described herein. Commands and data from the processor 1402 may be communicated over a communication bus 1404. The computer system may also include a main memory 1406, such as a random access memory (RAM), where the machine readable instructions and data for the processor 1402 may reside during runtime, and a secondary data storage 1408, which may be non-volatile and stores machine readable instructions and data. The memory and data storage are examples of computer readable mediums. The memory 1406 may include a configurable workload optimization module 1420 including machine readable instructions residing in the memory 1406 during runtime and executed by the processor 1402. The configurable workload optimization module 1420 may include the modules of the apparatus 100 shown in FIG. 1.

The computer system 1400 may include an I/O device 1410, such as a keyboard, a mouse, a display, etc. The computer system may include a network interface 1412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide configurable workload optimization, the machine readable instructions, when executed, cause at least one processor to:
   select a performance optimized application workload from a plurality of available performance optimized application workloads;

select a predetermined combination of a plurality of removable workload optimized modules to implement the selected performance optimized application workload, wherein different combinations of the plurality of removable workload optimized modules are usable to implement different ones of the plurality of available performance optimized application workloads;

manage the predetermined combination of the plurality of removable workload optimized modules to implement the selected performance optimized application workload;

receive data flows directed to the predetermined combination of the plurality of removable workload optimized modules;

analyze the data flows based on attributes of the data flows; and redirect the data flows for processing by at least one of the plurality of removable workload optimized modules of the predetermined combination of the plurality of removable workload optimized modules based on the analysis, wherein the selected performance optimized application workload includes intrusion prevention, and the predetermined combination of the plurality of removable workload optimized modules includes a network processing unit (NPU) module, and a field-programmable gate array (FPGA) module to implement intrusion prevention functionality.

2. The non-transitory computer readable medium of claim 1, wherein to redirect the data flows for processing by at least one of the plurality of removable workload optimized modules of the predetermined combination of the plurality of removable workload optimized modules based on the analysis, the machine readable instructions, when executed, further cause the at least one processor to:

redirect a subset of the data flows based on the analysis for processing by the predetermined combination of the plurality of removable workload optimized modules; and prevent a remaining subset of the data flows from being directed to the predetermined combination of the plurality of removable workload optimized modules.

3. The non-transitory computer readable medium of claim 1, wherein to redirect the data flows for processing by at least one of the plurality of removable workload optimized modules of the predetermined combination of the plurality of removable workload optimized modules based on the analysis, the machine readable instructions, when executed, further cause the at least one processor to:

separate incoming packets of the data flows into a known approved category that includes packets that show no signs of containing attacks, and forward the approved category packets to their intended destinations;

separate incoming packets of the data flows into a known disapproved category that includes packets that are to be dropped, and drop the disapproved category packets; and separate incoming packets of the data flows into a suspicious category that includes packets that need further inspection, and forward the suspicious category packets for further analysis.

4. The non-transitory computer readable medium of claim 1, further comprising machine readable instructions, that when executed, cause the at least one processor to:

use a cluster fabric to interconnect a plurality of slots, wherein each slot of the plurality of slots corresponds to each of the plurality of removable workload optimized modules.

5. A method for configurable workload optimization, the method comprising:

selecting a plurality of performance optimized application workloads from a plurality of available performance optimized application workloads;

selecting predetermined combinations of a plurality of removable workload optimized modules to implement the selected performance optimized application workloads, wherein different combinations of the plurality of removable workload optimized modules are usable to implement different ones of the plurality of available performance optimized application workloads;

managing, by at least one processor, the predetermined combinations of the plurality of removable workload optimized modules to implement the selected performance optimized application workloads;

receiving data flows directed to the predetermined combinations of the plurality of removable workload optimized modules;

analyzing the data flows based on attributes of the data flows; and redirecting the data flows for processing by at least one of the plurality of removable workload optimized modules of the predetermined combinations of the plurality of removable workload optimized modules based on the analysis, wherein redirecting the data flows for processing by at least one of the plurality of removable workload optimized modules of the predetermined combinations of the plurality of removable workload optimized modules based on the analysis, the method further comprises:

separating incoming packets of the data flows into a known approved category that includes packets that show no signs of containing attacks, and forwarding the approved category packets to their intended destinations;

separating incoming packets of the data flows into a known disapproved category that includes packets that are to be dropped, and dropping the disapproved category packets; and separating incoming packets of the data flows into a suspicious category that includes packets that need further inspection, and forwarding the suspicious category packets for further analysis.

6. The method of claim 5, further comprising:

using a cluster fabric to interconnect a plurality of slots, wherein each slot of the plurality of slots corresponds to each of the plurality of removable workload optimized modules.

7. The method of claim 5, wherein a selected performance optimized application workload of the plurality of the selected performance optimized application workloads includes intrusion prevention, and a predetermined combination of the plurality of removable workload optimized modules includes a network processing unit (NPU) module, and a field-programmable gate array (FPGA) module to implement intrusion prevention functionality.

8. A non-transitory computer readable medium having stored thereon machine readable instructions to provide configurable workload optimization, the machine readable instructions, when executed, cause at least one processor to:

select a performance optimized application workload from a plurality of available performance optimized application workloads;
select a predetermined combination of a plurality of removable workload optimized modules to implement the selected performance optimized application workload, wherein different combinations of the plurality of removable workload optimized modules are usable to implement different ones of the plurality of available performance optimized application workloads;
manage the predetermined combination of the plurality of removable workload optimized modules to implement the selected performance optimized application workload;
receive data flows directed to the predetermined combination of the plurality of removable workload optimized modules;
analyze the data flows based on attributes of the data flows; and
redirect the data flows for processing by at least one of the plurality of removable workload optimized modules of the predetermined combination of the plurality of removable workload optimized modules based on the analysis,
wherein the selected performance optimized application workload includes intrusion prevention, the plurality of removable workload optimized modules include a graphics processing unit (GPU) module, a network processing unit (NPU) module, a digital signal processing (DSP) module, and a field-programmable gate array (FPGA) module, and the predetermined combination of the plurality of removable workload optimized modules includes the NPU module, and the FPGA module to implement intrusion prevention functionality.

9. The non-transitory computer readable medium of claim 8, wherein to redirect the data flows for processing by at least one of the plurality of removable workload optimized modules of the predetermined combination of the plurality of removable workload optimized modules based on the analysis, the machine readable instructions, when executed, further cause the at least one processor to:
redirect a subset of the data flows based on the analysis for processing by the predetermined combination of the plurality of removable workload optimized modules; and
prevent a remaining subset of the data flows from being directed to the predetermined combination of the plurality of removable workload optimized modules.

10. The non-transitory computer readable medium of claim 8, further comprising machine readable instructions, that when executed, cause the at least one processor to:
use a cluster fabric to interconnect a plurality of slots, wherein each slot of the plurality of slots corresponds to each of the plurality of removable workload optimized modules.

11. A non-transitory computer readable medium having stored thereon machine readable instructions to provide configurable workload optimization, the machine readable instructions, when executed, cause at least one processor to:
select a performance optimized application workload from a plurality of available performance optimized application workloads;
select a predetermined combination of a plurality of removable workload optimized modules to implement the selected performance optimized application workload, wherein different combinations of the plurality of removable workload optimized modules are usable to implement different ones of the plurality of available performance optimized application workloads;
manage the predetermined combination of the plurality of removable workload optimized modules to implement the selected performance optimized application workload;
receive data flows directed to the predetermined combination of the plurality of removable workload optimized modules;
analyze the data flows based on attributes of the data flows; and
redirect the data flows for processing by at least one of the plurality of removable workload optimized modules of the predetermined combination of the plurality of removable workload optimized modules based on the analysis,
wherein to redirect the data flows for processing by at least one of the plurality of removable workload optimized modules of the predetermined combination of the plurality of removable workload optimized modules based on the analysis, the machine readable instructions, when executed, further cause the at least one processor to:
separate incoming packets of the data flows into a known approved category that includes packets that show no signs of containing attacks, and forward the approved category packets to their intended destinations;
separate incoming packets of the data flows into a known disapproved category that includes packets that are to be dropped, and drop the disapproved category packets; and
separate incoming packets of the data flows into a suspicious category that includes packets that need further inspection, and forward the suspicious category packets for further analysis.

12. The non-transitory computer readable medium of claim 11, further comprising machine readable instructions, that when executed, cause the at least one processor to:
use a cluster fabric to interconnect a plurality of slots, wherein each slot of the plurality of slots corresponds to each of the plurality of removable workload optimized modules.

13. A method for configurable workload optimization, the method comprising:
selecting a plurality of performance optimized application workloads from a plurality of available performance optimized application workloads;
selecting predetermined combinations of a plurality of removable workload optimized modules to implement the selected performance optimized application workloads, wherein different combinations of the plurality of removable workload optimized modules are usable to implement different ones of the plurality of available performance optimized application workloads;
managing, by at least one processor, the predetermined combinations of the plurality of removable workload optimized modules to implement the selected performance optimized application workloads;
receiving data flows directed to the predetermined combinations of the plurality of removable workload optimized modules;
analyzing the data flows based on attributes of the data flows; and
redirecting the data flows for processing by at least one of the plurality of removable workload optimized modules of the predetermined combinations of the plurality of removable workload optimized modules based on the analysis, wherein a selected performance optimized application workload of the plurality of the selected performance optimized application workloads includes intrusion prevention, and a predetermined combination of the plurality of removable workload optimized modules includes a network processing unit (NPU) module, and a field-programmable gate array (FPGA) module to implement intrusion prevention functionality.

14. The method of claim 13, further comprising:

using a cluster fabric to interconnect a plurality of slots, wherein each slot of the plurality of slots corresponds to each of the plurality of removable workload optimized modules.

* * * * *